(12) United States Patent
Kim

(10) Patent No.: US 8,465,154 B2
(45) Date of Patent: Jun. 18, 2013

(54) VEHICLE INSTRUMENT PANEL WITH REAR PROJECTION SYSTEM

(75) Inventor: Ju Hyun Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 734 days.

(21) Appl. No.: 12/617,133

(22) Filed: Nov. 12, 2009

(65) Prior Publication Data

US 2010/0208208 A1    Aug. 19, 2010

(30) Foreign Application Priority Data

Feb. 16, 2009    (KR) .................. 10-2009-0012346

(51) Int. Cl.
*G03B 21/28* (2006.01)
*G03B 21/00* (2006.01)

(52) U.S. Cl.
USPC .................. 353/13; 353/14; 353/11; 353/12; 353/82

(58) Field of Classification Search
USPC .................. 353/13, 14, 11, 12, 15, 119, 122, 353/82
See application file for complete search history.

(56) References Cited

FOREIGN PATENT DOCUMENTS

| JP | 04-343324 A | 11/1992 |
|---|---|---|
| JP | 2002-052955 A | 2/2002 |
| JP | 2005-335510 A | 12/2005 |
| JP | 2006-007935 A | 1/2006 |
| JP | 2007-225572 A | 9/2007 |
| KR | 10-2008-0048408 | 6/2008 |

*Primary Examiner* — Tony Ko
(74) *Attorney, Agent, or Firm* — Edwards Wildman Palmer LLP; Peter F. Corless

(57) ABSTRACT

The present invention relates, generally, to a vehicle dashboard using rear projection system. A vehicle dashboard using rear projection system of the present invention preferably includes: a screen that provides a visual image; a printed circuit board (PCB) that controls the provision of a graphic image to the screen; and an projection system projection system that is controlled by the printed circuit board, and is installed at a rear side of the printed circuit board and irradiates a light to the screen.

5 Claims, 7 Drawing Sheets

VEHICLE INSTRUMENT PANEL WITH REAR PROJECTION SYSTEM

CROSS-REFERENCE TO RELATED APPLICATION

This application is based on, and claims priority from, Korean Patent Application No. 10-2009-0012346, filed on Feb. 16, 2009 in the Korean Intellectual Property Office, the disclosure of which is incorporated herein in its entirety by reference.

BACKGROUND OF THE INVENTION

The present invention relates, in general, to a vehicle dashboard using a rear projection system. In particular embodiments, the present invention is directed to a vehicle dashboard that includes a projector using a dual mirror in a rear side of a vehicle dashboard to suitably implement a graphic image with various sizes and forms in a vehicle dashboard.

Generally, the vehicle dashboard, called a cluster gauge, is a gauge board which can suitably inform a driver of the overall driving state of vehicle. Typically, the driver frequently looks at the vehicle dashboard to suitably determine the driving state while gazing steadily at the forward area.

In general, the conventional vehicle dashboard expresses the value of velocity of car, RPM, quantity of oil sensed through a detection sensor by the movement of needle, so that the driver reads the number indicated by the needle and can suitably find out information of the state of the driving vehicle.

Accordingly, technology to suitably express a graphic image on the vehicle dashboard by using a projector has been developed. However, using this technology, a distortion of graphic image projection position and image is generated according to the location of projector in the vehicle dashboard using the existing projector.

The above information disclosed in this the Background section is only for enhancement of understanding of the background of the invention and therefore it may contain information that does not form the prior art that is already known in this country to a person of ordinary skill in the art.

SUMMARY OF THE INVENTION

The present invention features a projection system using a dual mirror in the rear side of a vehicle dashboard such that a graphic image can be variously projected regardless of the location of the front side of a vehicle dashboard dial plate and, according to preferred embodiments of the present invention, the image distortion can be suitably minimized.

In accordance with a preferred embodiment of the present invention, a vehicle dashboard using rear projection system includes, but may not be limited only to: a screen that provides a visual image; a printed circuit board (PCB) that suitably controls the provision of a graphic image to the screen; and a projection system that is suitably controlled by the printed circuit board, and is suitably installed at a rear side of the printed circuit board and irradiates a light to the screen.

Preferably, the projection system includes, but may not be limited only to: a projector that projects a light; a first mirror that reflects the light projected by the projector; and a second mirror that reflects again the light reflected by the first mirror to be suitably projected into the screen. Preferably, the printed circuit board includes a graphic controller which suitably controls a shape and size of the visual image displayed on the screen. Preferably, the projection system suitably controls a size of the visual image according to a gap between the first mirror and the projector. Preferably, in a preferred embodiment of the invention, in the image projecting device, the size of the visual image is suitably increased as the gap between the first mirror and the projector increases. Preferably, the first mirror and the second mirror are suitably inclined with an identical angle, while being inclined in a different direction. In certain preferred embodiments of the invention, the projection system identically changes an angle of the first mirror and second mirror to be suitably inclined with an identical angle, while the first mirror and the second mirror are suitably inclined in a different direction. Preferably, the printed circuit board includes a graphic controller which suitably controls a shape and size of the visual image displayed on the screen.

As described above, the vehicle dashboard of the present invention suitably utilizes the rear surface space of vehicle dashboard such that the space can be efficiently utilized, and the graphic image distortion can be suitably minimized by using a dual mirror.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

As referred to herein, a hybrid vehicle is a vehicle that has two or more sources of power, for example both gasoline-powered and electric-powered.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated by the accompanying drawings which are given hereinafter by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

As described herein, the present invention includes a vehicle dashboard using rear projection system, comprising a screen that provides a visual image, a printed circuit board (PCB), and a projection system that is controlled by the printed circuit board.

In one embodiment, the PCB controls the provision of a graphic image to the screen.

In another embodiment, the projection system is installed at a rear side of the printed circuit board and irradiates a light to the screen.

The invention also features a motor vehicle comprising the vehicle dashboard of any one of the aspects described herein.

Figure 1:
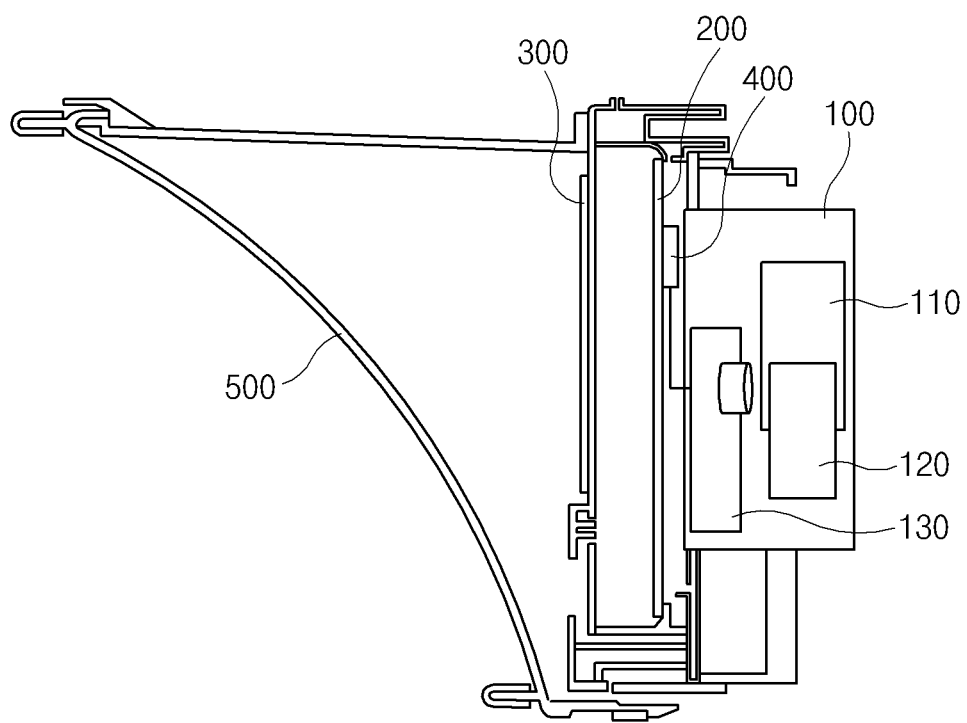
FIG. 1 is a cross sectional view of a vehicle dashboard according to an embodiment of the present invention.

Hereinafter, exemplary embodiments of the present invention will be described in detail with reference to the attached drawings FIG. 1 is a cross sectional view of a vehicle dashboard according to one preferred embodiment of the present invention.

In one exemplary embodiment, the vehicle dashboard of the present invention includes a projection system 100, a PCB (printed circuit board) 200, a screen 300, a graphic controller 400 and a window acryl 500. Preferably, the projection system 100 is connected to the graphic controller 400 through a communications cable.

In a further preferred embodiment, the form of the graphic image of the projection system 100 which is to be projected into the screen 300 is suitably controlled by the graphic controller 400.

In another exemplary embodiment, the projection system 100 is suitably arranged in the rear side of the PCB 200 of the vehicle dashboard and the graphic image is suitably projected to the screen 300, so that the projection system 100 is preferably not shown in the outside and the graphic image can be suitably projected to the top portion of vehicle dashboard dial plane.

In further preferred embodiments, it is not necessary to suitably increase the width of the vehicle dashboard for additional space for the projection system 100, as the rear surface space of the vehicle dashboard is suitably utilized. In other further embodiments, the projection system 100 is suitably positioned at the location adjacent to the PCB 200 to facilitate the connection with the graphic controller 400.

Preferably, the PCB 200 suitably controls the indications of vehicle dashboard such as, but not only limited to, a flow-meter, a speed-meter, and a RPM system and suitably includes the graphic controller 400 for controlling the projection system 100. Preferably, the screen 300 is a rear screen and is suitably installed at the dial plane of vehicle dashboard to display the graphic image projected by the projection system 100.

Figure 2:
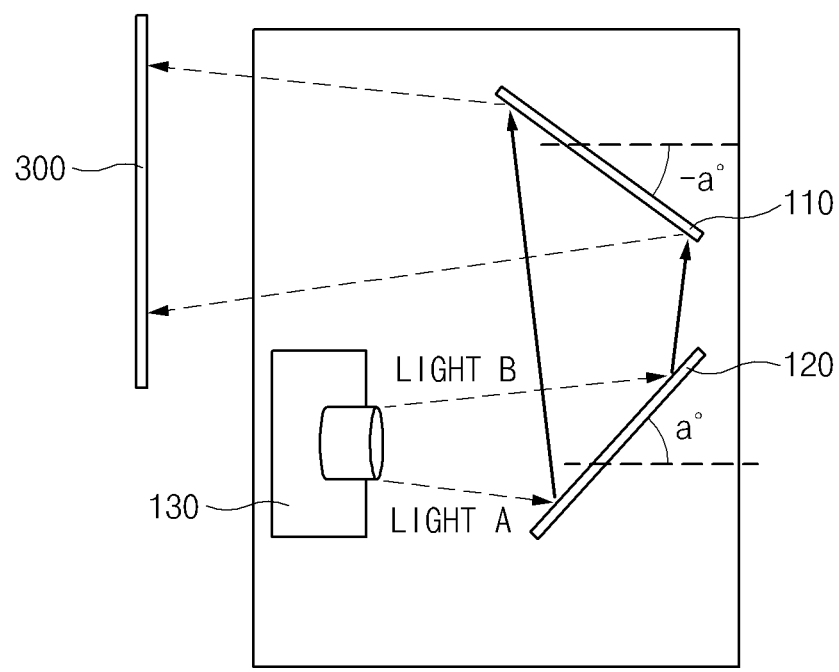
FIG. 2 is a detail configuration view of a projection system according to an embodiment of the present invention.

FIG. 2 is a detail configuration view of the projection system 100 according to another preferred embodiment of the present invention.

According to one exemplary embodiment, the projection system 100 preferably includes a dual mirror 110, 120 and a projector 130. Preferably, if the projector 130 projects light A and light B, the light A and the light B are first reflected by the mirror 120, and the reflected lights are second reflected to the mirror 110 to be projected on the screen 300.

Accordingly, it is preferable that the mirror 110 and the mirror 120 are suitably inclined with an angle a in a different direction. Further, the light A and the light B suitably projected from the projector 130 have the identical driving distance for reaching the screen 300 through mirrors 110, 120 such that the image is not distorted.

Figure 3:
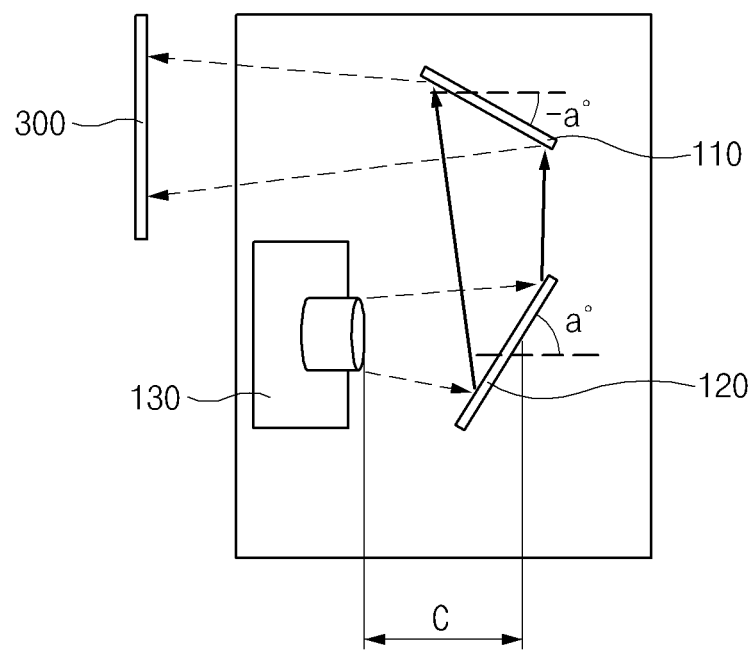
FIG. 3 is a schematic that illustrates one example of the adjustment of graphic image size according to the adjustment of the position of the mirror of FIG. 2.
Figure 4:
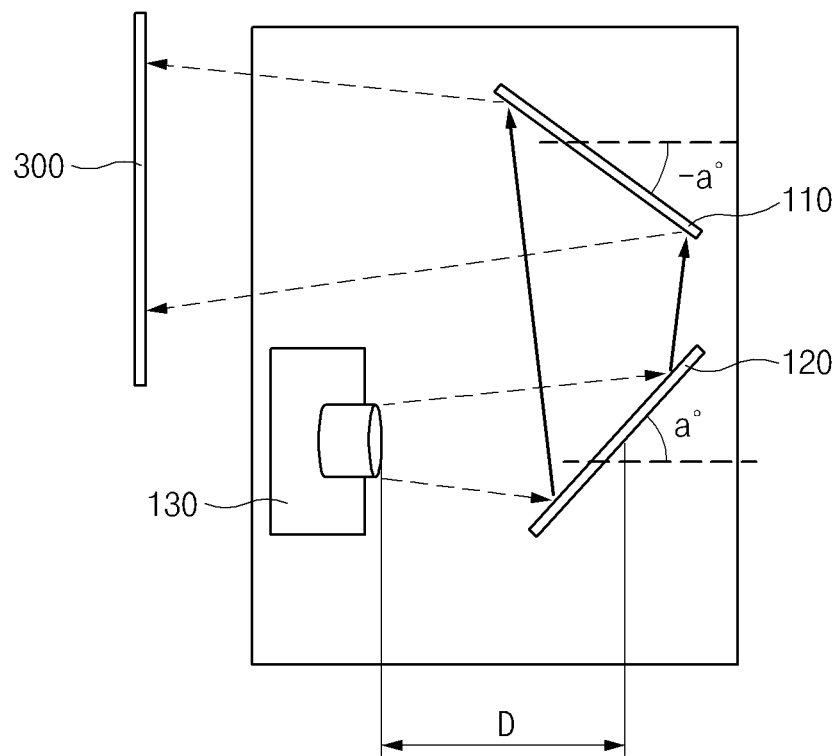
FIG. 4 is a schematic that illustrates one example of the adjustment of graphic image size according to the adjustment of the position of the mirror of FIG. 2.
Figure 5:
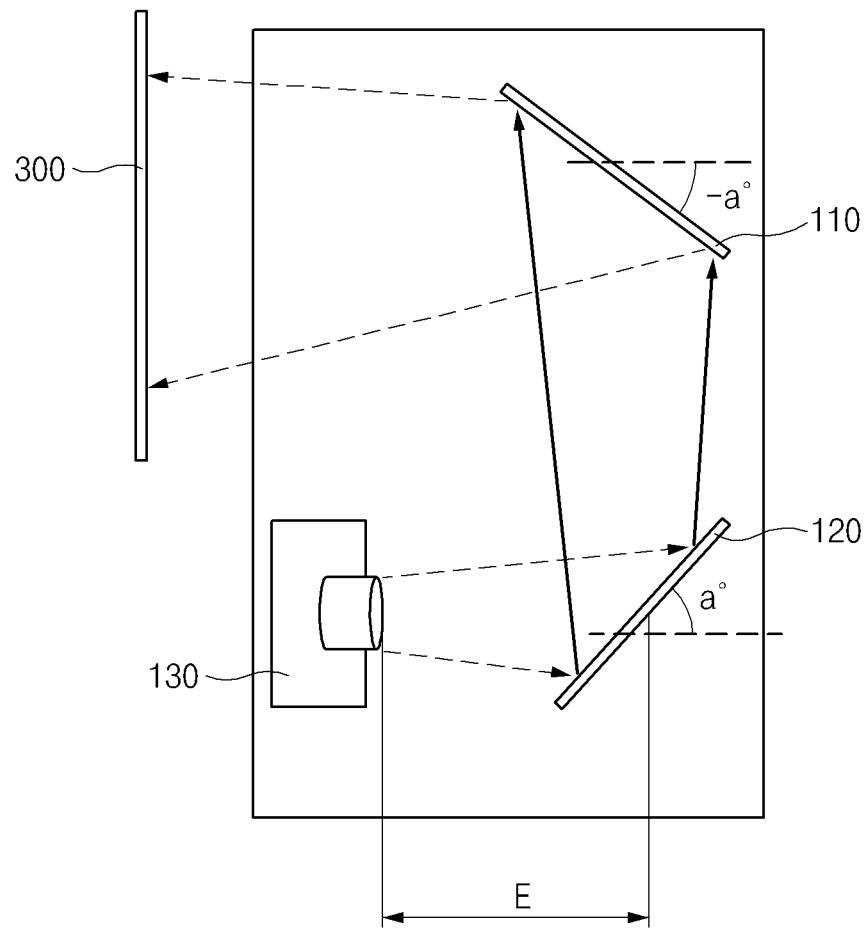
FIG. 5 is a schematic that illustrates one example of the adjustment of graphic image size according to the adjustment of the position of the mirror of FIG. 2.

According to certain preferred embodiments, for example as shown in FIGS. 3 to 5, the size of the graphic image projected into the screen 300 is suitably adjusted according to a gap between the mirror 120 and the projector 130.

FIGS. 3 to 5 are an example of successively increasing the gap between the mirror 120 and the projector 130, according to certain preferred embodiments of the present invention, and are an example of indicating a small size, a middle size, and a large size according to the gap between the mirror 120 and the projector 130. Further, it is preferable that the size of mirror 110, 120 is suitably increased in case the gap between the mirror 120 and the projector 130 is increased. Preferably, in case the gap between the mirror 120 and the projector 130 is remote, a visual image can be implemented with a large size.

According to further exemplary embodiments, it is preferable that the size in a direction vertical to the PCB 200 is set with a given size in consideration of the size of rear side of the vehicle dashboard when suitably increasing the visual image size.

Figure 6A:
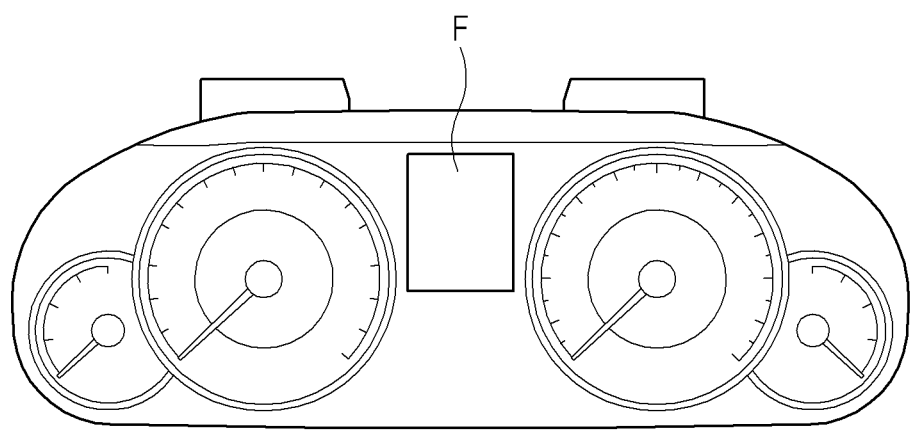
FIGS. 6a and 6b are drawings that illustrate an example of projecting a graphic image to a vehicle dashboard according to an embodiment of the present invention.

FIG. 6a is an example of projecting a graphic image to a vehicle dashboard according to an exemplary embodiment of the present invention, and showing an example of projecting the graphic image (F) in the upper end of central part of vehicle dashboard.

Figure 6B:
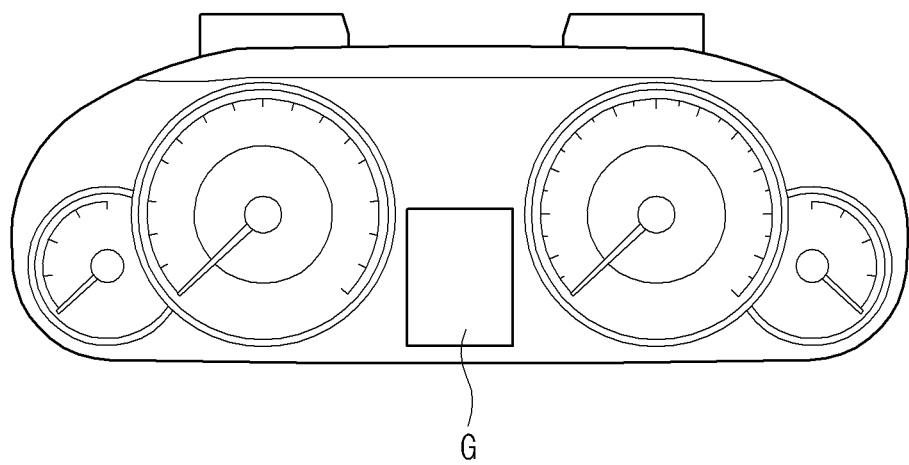

FIG. 6b is an example of projecting a graphic image to a vehicle dashboard according to another exemplary embodiment of the present invention, and showing an example of projecting the graphic image (G) in the lower end of central part of vehicle dashboard.

Preferably, the location shift of the graphic image can be suitably performed by adjusting angles of mirrors 110, 120. According to further preferred embodiments, it is preferable that the angles of mirrors 110, 120 are identically adjusted.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A vehicle dashboard using rear projection system, comprising: a screen that provides a visual image;
  a printed circuit board (PCB) that controls the provision of a graphic image to the screen; and
  an projection system that is controlled by the printed circuit board, and is installed at a rear side of the printed circuit board and irradiates a light to the screen, the projection system including:
    a projector that projects light;
    a first minor that reflects the light projected by the projector; and
    a second minor that reflects again the light reflected by the first mirror to be projected into the screen, wherein the first mirror and the second mirror are inclined with an identical angle, while being inclined in a different direction
  wherein the printed circuit board includes a graphic controller which controls a shape and size of the visual image displayed on the screen.

2. The vehicle dashboard of claim 1, wherein the projection system controls a size of the visual image according to a gap between the first minor and the projector.

3. The vehicle dashboard of claim 2, wherein, in the projection system, the size of the visual image is increased as the gap between the first mirror and the projector increases.

4. The vehicle dashboard of claim 1, wherein the projection system identically changes an angle of the first mirror and second minor to be inclined with an identical angle, while the first mirror and the second mirror are inclined in a different direction.

5. The vehicle dashboard of claim 1, wherein the printed circuit board includes a graphic controller which controls a shape and size of the visual image displayed on the screen.

* * * * *